(12) United States Patent
Yamaguchi et al.

(10) Patent No.: US 7,973,691 B2
(45) Date of Patent: Jul. 5, 2011

(54) DATA RECOVERY CIRCUIT, DATA RECOVERY METHOD AND DATA RECEIVING APPARATUS

(75) Inventors: Hisakatsu Yamaguchi, Kawasaki (JP); Hirotaka Tamura, Kawasaki (JP); Masaya Kibune, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/621,616

(22) Filed: Nov. 19, 2009

(65) Prior Publication Data

US 2010/0127906 A1 May 27, 2010

(30) Foreign Application Priority Data

Nov. 27, 2008 (JP) ................................. 2008-303080

(51) Int. Cl.
*H03M 1/12* (2006.01)
(52) U.S. Cl. ............................ 341/155; 341/133; 341/61
(58) Field of Classification Search .................. 341/155; 375/355, 290; 369/103
See application file for complete search history.

(56) References Cited

U.S. PATENT DOCUMENTS

| | | | |
|---|---|---|---|
| 6,907,096 B1 * | 6/2005 | Lueker et al. ................. | 375/355 |
| 6,907,417 B2 * | 6/2005 | Alpert ............................. | 706/55 |
| 7,606,340 B2 * | 10/2009 | Cheng et al. .................. | 375/354 |
| 2006/0285469 A1 * | 12/2006 | Tonami ......................... | 369/103 |
| 2007/0092040 A1 * | 4/2007 | Higashino ..................... | 375/327 |
| 2009/0190703 A1 * | 7/2009 | Nguyen et al. ................ | 375/355 |

OTHER PUBLICATIONS

Takauchi, Hideki et al., "A CMOS Multi-Channel 10Gb/s Transceiver",*ISSCC 2003 / Session 4 / Clock Recovery and Backplane Transceivers / Paper 4.2* Feb. 9, 2003.

* cited by examiner

*Primary Examiner* — Peguy JeanPierre
(74) *Attorney, Agent, or Firm* — Fujitsu Patent Center

(57) ABSTRACT

A data recovery circuit includes an analog-digital converter creating a digital code sequence, a phase detector calculating a position of a crossing point from the digital code sequence, a phase estimator acquiring a presumed position of a data center point of a data sequence based on the position of the crossing point, and a data determining circuit extracting the sequence of data determination values from the digital code sequence based on the position of the crossing point and the presumed position of the data center point.

15 Claims, 16 Drawing Sheets

FIG. 11

IF PINST > PPICK

| A | B | C | D=(A^B) | E=(B^C) | F=(D^E) | G=F&(PINST>PPICK) | SEL1 | H=~F \| ~(PINST<=PPICK) | SEL2 |
|---|---|---|---------|---------|---------|-------------------|------|-------------------------|------|
| 1 | 1 | 1 | 0 | 0 | 0 | 0 | B | 1 | B |
| 1 | 1 | 0 | 0 | 1 | 1 | 1 | A | 1 | B |
| 1 | 0 | 1 | 1 | 1 | 0 | 0 | B | 1 | B |
| 1 | 0 | 0 | 1 | 0 | 1 | 1 | A | 1 | X |
| 0 | 1 | 1 | 1 | 0 | 1 | 1 | A | 1 | X |
| 0 | 1 | 0 | 1 | 1 | 0 | 0 | B | 1 | B |
| 0 | 0 | 1 | 0 | 1 | 1 | 1 | A | 1 | B |
| 0 | 0 | 0 | 0 | 0 | 0 | 0 | B | 1 | B |

IF PINST <= PPICK

| A | B | C | D=(A^B) | E=(B^C) | F=(D^E) | G=F&(PINST>PPICK) | SEL1 | H=~F \| ~(PINST<=PPICK) | SEL2 |
|---|---|---|---------|---------|---------|-------------------|------|-------------------------|------|
| 1 | 1 | 1 | 0 | 0 | 0 | 0 | B | 1 | B |
| 1 | 1 | 0 | 0 | 1 | 1 | 0 | X | 0 | C |
| 1 | 0 | 1 | 1 | 1 | 0 | 0 | B | 1 | B |
| 1 | 0 | 0 | 1 | 0 | 1 | 0 | B | 0 | B |
| 0 | 1 | 1 | 1 | 0 | 1 | 0 | B | 0 | B |
| 0 | 1 | 0 | 1 | 1 | 0 | 0 | B | 1 | B |
| 0 | 0 | 1 | 0 | 1 | 1 | 0 | X | 0 | C |
| 0 | 0 | 0 | 0 | 0 | 0 | 0 | B | 1 | B |

DATA RECOVERY CIRCUIT, DATA RECOVERY METHOD AND DATA RECEIVING APPARATUS

CROSS-REFERENCE TO RELATED APPLICATIONS

This application is based upon and claims the benefit of priority from the prior Japanese Patent Application No. 2008-303080, filed on Nov. 27, 2008, the entire contents of which is incorporated herein by reference.

FIELD

The invention relates to a data recovery circuit and method.

BACKGROUND

The performance of the parts to be included in computers and other information processing apparatuses, such as SRAMs, DRAMs, processors and switching LSIs, have been improved greatly. However, even with the parts with improved performance, it is difficult to improve the system performance if the signal transmission velocities between the parts are not improved. For example, in recent years, the gap between the working speed of a memory such as an SRAM and a DRAM and the working speed of a processor has been increasing. The gap in speed is hindering the improvement of the performance of computers. The speed of the signal transmission between chips and the speed of the signal transmission between elements and/or circuit blocks within the chips are becoming large factors in limitation of chip performance with the increases in size of the chips. The signal transmission between a peripheral apparatus and a processor or a chip set may be a factor in limitation of the performance of the entire system.

In general, for the signal transmission between circuit blocks, signal transmission between chips or signal transmission within a package, the receiver side recovers clocks from receive data and uses the recovered clocks to perform 0/1 determination on the receive data. At that time, in order to perform proper signal reception, a feedback circuit within the circuit adjusts the phase of the recovered clocks so that the recovered clocks and the receive data may have a certain phase relationship. The method including recovering clocks and determining the receive data by using recovered clocks is called Clock and Data Recovery (CDR). CDR is one of the most important technologies for signal transmission.

CDR employs a circuit that generates an internal clock signal for performing data reception, a comparing circuit that compares the phase of the internal clock signal to the phase of an input data signal, and a feedback circuit that adjusts the phase of the internal clock signal based on the comparison result. More specifically, first of all, in synchronization with the timing of the rising edge of the generated internal clock signal, for example, the data determining circuit performs logical determination (or 0/1 determination) on input data. At this time, data RDT, which is determined in the vicinity of the center of an Eye waveform of the input data, and data BDT, which is determined in the vicinity of the transition point of the input data, are derived. When the RDT changes from 0 to 1 or from 1 to 0, whether the BDT agrees with the RDT data before the transition or the RDT data after the transition may be determined. Thus, whether the phase of the internal clock signal is earlier than the phase of the input data or not is determined. In accordance with the phase relationship between the phase of the internal clock signal and the phase of the input data, the timing of the rising edge of the internal clock signal may be adjusted to control the position of the rising edge of the internal clock signal so that the position may be in the vicinity of the center of the Eye waveform of the input data. Thus, the timings of the internal clock signal may be adjusted in accordance with the jitter of input data, whereby the data determination may be performed accurately.

In the configuration of CDR in the past, the ability for detecting the amount of jitter of the input data depends on the phase shift precision of an internal clock signal. For example, if the phase resolution of the internal clock signal is 6 bits, the phase of the internal clock signal may be changed in steps of 0.015625 Unit Intervals (UI). In other words, the jitter may be detected with 0.015625 UI precision. A CDR circuit having a feedback configuration that dynamically changes the sampling timing of input data may require the high detection sensitivity as in this example.

In the CDR circuit in the configuration in the past, in order to change the phase of a clock signal, an analog component circuit such as a Phase Interpolator (PI) has been used. However, because the operations by the PI are susceptible to the variations among processes or changes in power supply voltage, the characteristics based on the phase of the CDR circuit also changes. The technology relating to the clock reproduction has been disclosed in Hideki Takauchi, "A CMOS Multi-Channel 10 Gb/s Transceiver," 2003 IEEE International Solid-State Circuits Conference, 2003.

SUMMARY

According to an aspect of the invention, a data recovery circuit includes an analog-digital converter creating a digital code sequence; a phase detector calculating, from the digital code sequence, a position of a crossing point; a phase estimator acquiring a presumed position of a data center point of a data sequence based on the position of the crossing point; and a data determining circuit extracting the sequence of a data determination value from the digital code sequence based on the position of the crossing point and the presumed position of the data center point.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 11 illustrates logical value tables of circuit operation in FIG. 10.

DESCRIPTION OF EMBODIMENTS

Figure 1:
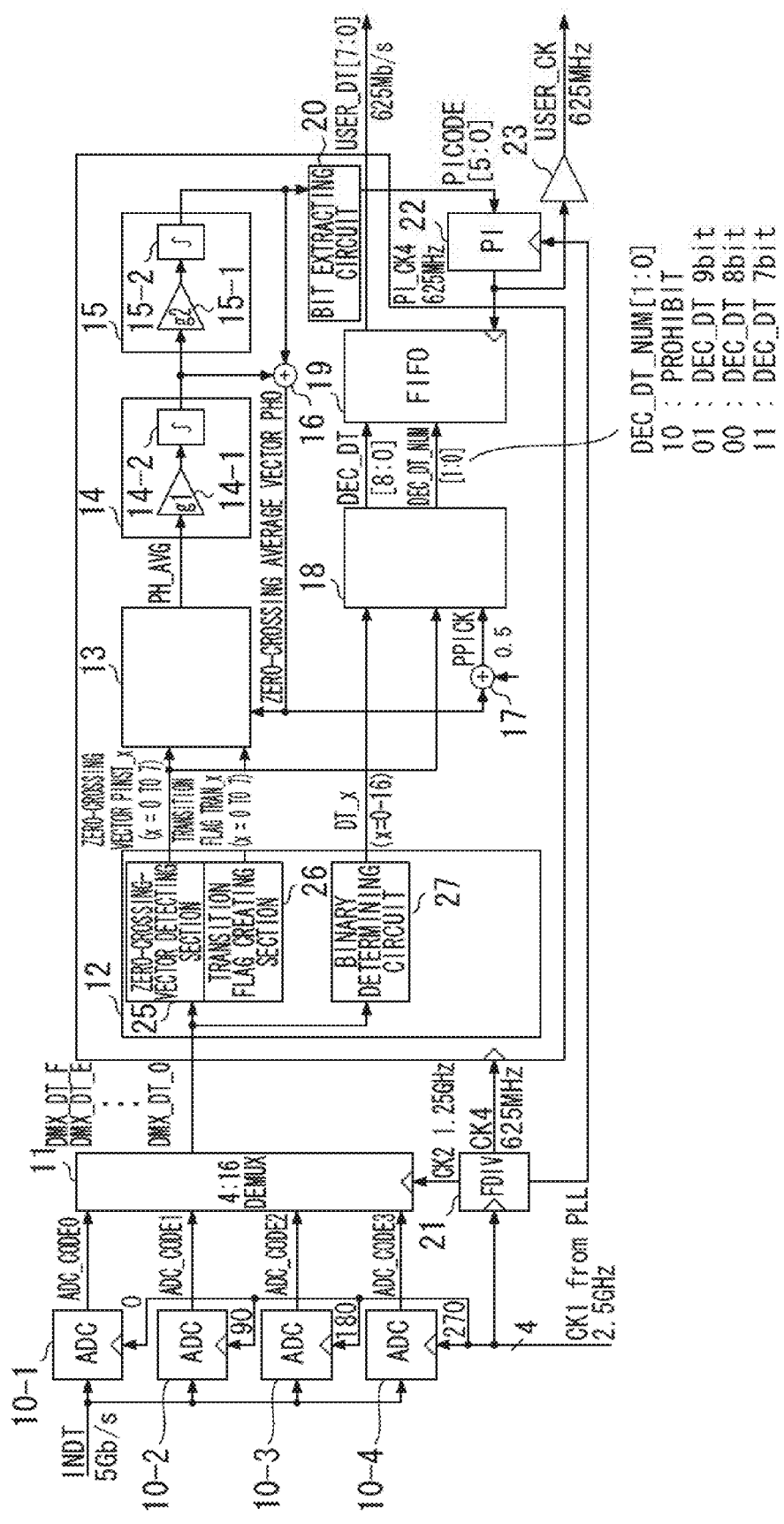
FIG. 1 is an example of a data recovery circuit.

FIG. 1 is an example of a data recovery circuit. The data recovery circuit in FIG. 1 includes a phase detector 12, a phase differential device 13, a phase integrator 14, a phase integrator 15, an adder 16, an adder 17, a data determining section 18, a determination data output section 19, and a bit extracting circuit 20. The data recovery circuit further includes analog-digital converters (ADCs) 10-1 to 10-4, a demultiplexer (DEMUX) 11, a frequency dividing circuit (FDIV) 21, a phase interpolator (PI) 22, and a buffer 23.

The analog-digital converters 10-1 to 10-4 perform analog-digital conversion on an input analog signal INDT representing a data sequence in synchronization with a clock signal CK1, and create an sequence of digital codes sampled at shorter intervals than the data interval of the data sequence. The clock signal CK1 includes a clock signal having four phases which are spaced 90° apart. With the four-phase clock signal, the input analog signal INDT is sampled at the timings of 0° phase, 90° phase, 180° phase, and 270° phase. In the example in FIG. 1, the input analog signal INDT is for example 5 Gbit/second, and the frequency of the clock signal CK1 is for example 2.5 GHz. With the four-phase clock signal, sampling is performed at two points for each one UI (or one unit interval), which is a data interval (200 ps) of the data sequence of the input analog signal INDT. The sampling provides the sequence of digital codes ADC_CODE0 to ADC_CODE3 representing the amplitude value of the input analog signal INDT in a digital value.

The demultiplexer 11 performs 4:16 demultiplexing on the sequences of digital codes ADC_CODE0 to ADC_CODE3 by using a clock signal CK2 at 1.25 GHz, which is generated by the frequency dividing circuit 21 by dividing the frequency of the clock signal CK1, as a synchronous signal. In other words, the demultiplexer 11 outputs four codes to each of the digital codes in parallel by performing 1:4 demultiplexing on the digital codes ADC_CODE0 to ADC_CODE3 on the time axis. As a result, the output of the demultiplexer 11 is a sequence of digital codes, which output 16 digital codes DMX_DT_0 to DMX_DT_F (where F indicates sexadecimal 15) in parallel in synchronization with the clock signal at 625 MHz.

The processing as described above by the analog-digital converter 10-1 to 10-4 and demultiplexer 11 serial-parallel converts and puts high-speed data of one bit into groups of 16 bits and creates low-speed data, which is parallel data of 16 bits. This reduces the data rate 5 Gbit/second to the data rate 625 Mbps and allows the implementation of the subsequent digital processing. Notably, the parallel data of 16 bits corresponds to the data of 8 UIs of the input analog signal INDT. The downstream digital processing, which will be described below, collectively processes the 8 UI data in parallel. Notably, the data rate conversion is not an essential feature, and a reduction in data rate is not required if the digital processing is able to be performed at a high speed. The processing for every 8 UIs is just an example, and processing may be performed on every arbitrary number of UIs. For example, it may be processing on every 4 UIs or processing on every 1 UI.

The digital processing circuit including the phase detector 12, phase differential device 13, phase integrator 14, phase integrator 15, adder 16, adder 17, data determining section 18, determination data output section 19, and bit extracting circuit 20 illustrated in FIG. 1 receives the supply of a clock signal CK4. The clock signal CK4 is a signal at a frequency of 625 MHz, which is created by the frequency dividing circuit 21 by dividing the frequency of the clock signal CK1. In synchronization with the clock signal CK4, the components of the digital processing circuit operate and perform digital processing on parallel data of 16 bits corresponding to 8 UIs of the input analog signal INDT.

Figure 2:
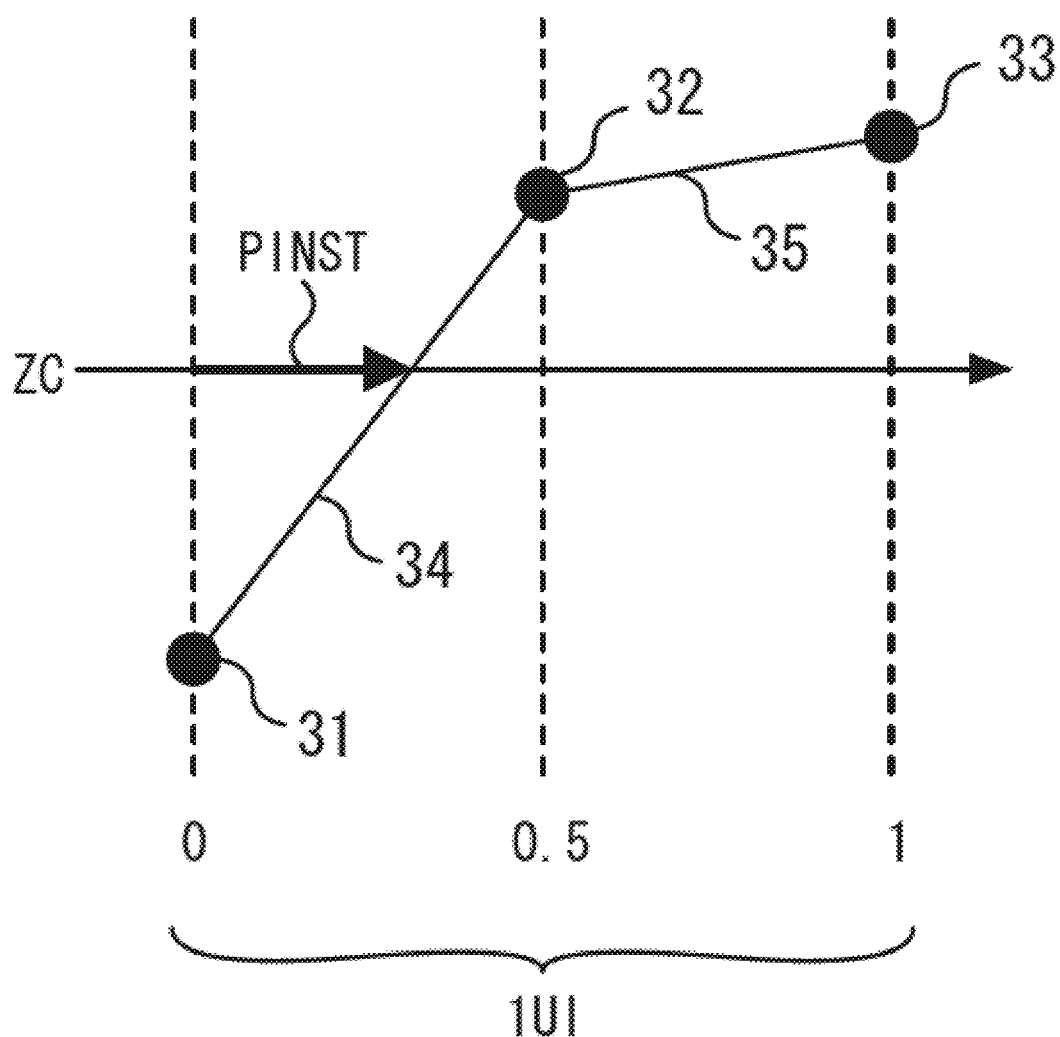
FIG. 2 is a diagram of an operation of a phase detector.

FIG. 2 is a diagram illustrating an operation by the phase detector 12. In FIG. 2, coordinate points 31 to 33 correspond to serial three digital codes in the sequence of 16 digital codes of DMX_DT_0 to DMX_DT_F. The serial three digital codes may be, for example, DMX_DT_0, DMX_DT_1 and DMX_DT_2. In this case, the horizontal position of the coordinate point 31 corresponds to the sampling timing for DMX_DT_0, and the vertical position of the coordinate point 31 corresponds to the value of the digital code DMX_DT_0. In the same manner, the horizontal position of the coordinate point 32 corresponds to the sampling timing for DMX_DT_1, and the vertical position of the coordinate point 32 corresponds to the value of the digital code DMX_DT_1. The horizontal position of the coordinate point 33 corresponds to the sampling timing for DMX_DT_2, and the vertical position of the coordinate point 33 corresponds to the value of the digital code DMX_DT_2.

The interval between the sampling timings may be ¼ (100 ps) of one cycle (400 ps) of a clock signal at 2.5 GHz in the example in FIG. 1. In this case, the sampling interval in the horizontal axis direction illustrated in FIG. 2 corresponds to 100 ps, and the interval between the coordinate points 31 and 33 is 200 ps. The interval 200 ps between the coordinate points 31 and 33 correspond to 1 UI of the input analog signal INDT.

The phase detector 12 calculates, from the sequence of digital codes, the position of the crossing point where a position ZC of a specific code value at a substantial center of the range of the possible values of the digital codes and the line acquired by interpolating the sequence of digital codes cross. FIG. 2 illustrates a segment 34 and a segment 35, which are acquired by interpolating the sequences of the digital codes. The segment 34 is acquired by performing linear interpolation on between the coordinate points 31 and 32. The segment 35 is acquired by performing linear interpolation on between the coordinate points 32 and 33. The range of the possible values of the digital codes is 0 to 31 when the digital codes are 5 bits. In this case, the code value 15.5 at the center of the range of values 0 to 31, which are possible values of the digital codes, corresponds to the position ZC. The phase detector 12 performs digital calculation to acquire the position PINST of the crossing point where the horizontal line at the position ZC and the segment acquired by the interpolation cross. The code value at the center may be a value rounded off to an integer value (for example 15 or 16,). The position PINST may be the distance from the left end of the UI to the crossing point, which is represented by a specific bit count.

Figure 3:
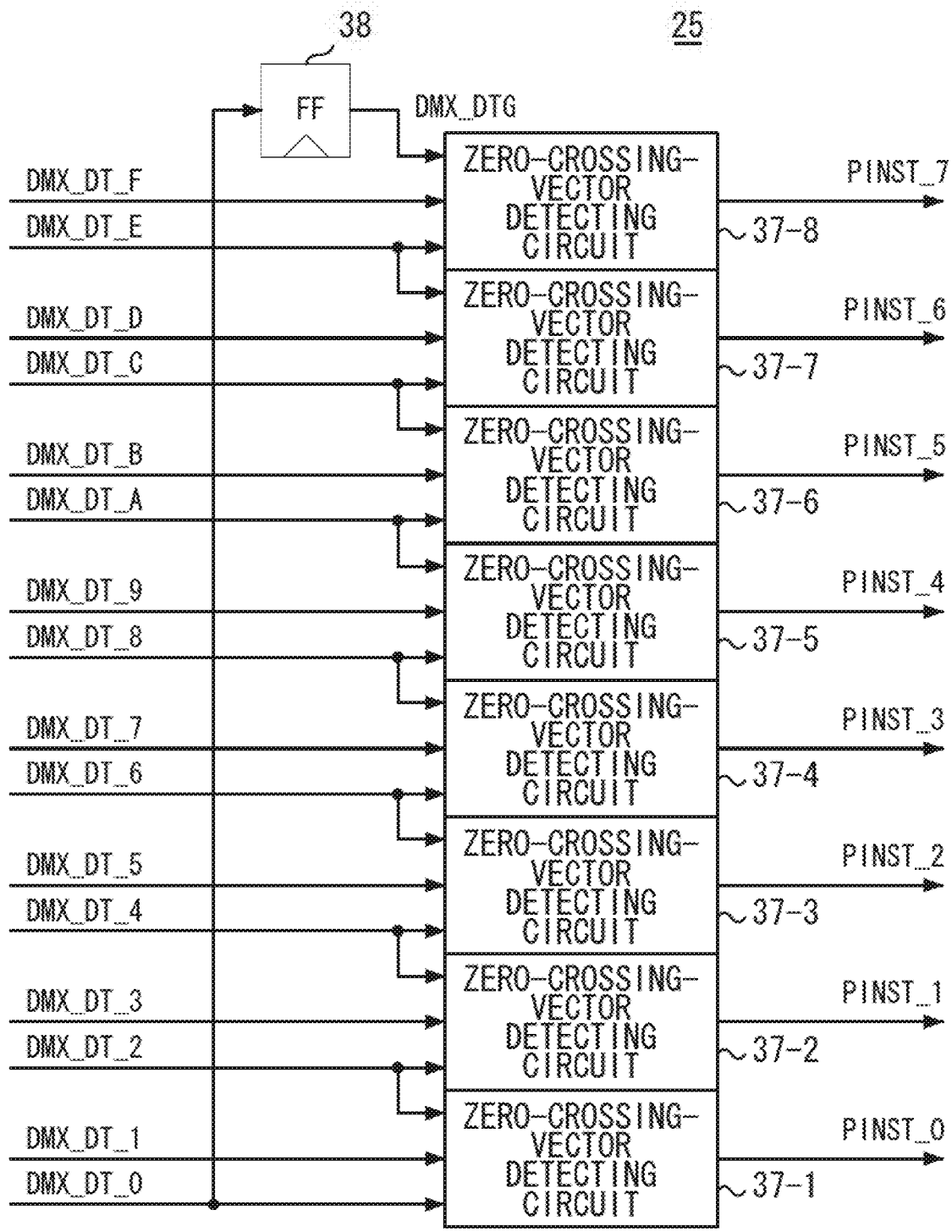
FIG. 3 is an example of a zero-crossing-vector detecting section in the phase detector.

FIG. 3 illustrates an example of a zero-crossing-vector detecting section 25 in the phase detector 12. The phase detector 12 illustrated in FIG. 3 includes zero-crossing-vector detecting circuits 37-1 to 37-8 and a flip-flop 38. Each of the zero-crossing-vector detecting circuits 37-1 to 37-8 calculates the position PINST of the crossing point in the corresponding 1 UI section. Thus, the positions PINST of eight crossing points in 8 UIs are calculated in parallel.

The zero-crossing-vector detecting circuit 37-1 receives the digital codes DMX_DT_0 to DMX_DT_2 from the demultiplexer 11 and outputs the position PINST_0 of the corresponding crossing point. The zero-crossing-vector detecting circuit 37-2 receives the digital codes DMX_DT_2 to DMX_DT_4 from the demultiplexer 11 and outputs the position PINST_1 of the corresponding crossing point. The zero-crossing-vector detecting circuit 37-3 receives the digital codes DMX_DT_4 to DMX_DT_6 from the demultiplexer 11 and outputs the position PINST_2 of the corresponding crossing point. In the same manner, the zero-crossing-vector detecting circuits 37-4 to 37-7 receive the corresponding digital codes from the demultiplexer 11 and output the positions PINST_3 to PINST_6 of the corresponding crossing points. The zero-crossing-vector detecting circuit 37-8 receives the digital codes DMX_DT_E and DMX_DT_F from the demultiplexer 11. The zero-crossing-vector detecting circuit 37-8 further receives, as DMX_DT_G, the digital code DMX_DT_0 positioned at the end of 8 UIs of the last operation cycle, which is held by the flip-flop 38. Accordingly, the zero-crossing-vector detecting circuit 37-8 outputs the position PINST_7 of the corresponding crossing point.

In FIG. 1, the phase differential device 13, phase integrator 14, phase integrator 15, adder 16, and adder 17 make up a phase estimator. The phase estimator acquires a presumed position PPICK of the data center point of the data sequence of the input analog signal INDT based on the position PINST of the crossing point acquired in the way described above. The phase differential device 13, phase integrator 14, phase integrator 15, and adder 16 acquire an average position PHO in time of the position PINST of the crossing point. The adder 17 acquires the presumed position PPICK of the data center point by shifting the average position PHO by the amount of shift (0.5 UI) which is substantially equal to half of the data interval.

The average position PHO in time of the position PINST of the crossing point is the presumed position of the crossing point and is supplied to the phase differential device 13. The phase differential device 13 acquires the difference between the position PINST of the crossing point and the presumed crossing point position PHO. The phase integrators 14 and 15 integrate in time the difference acquired by the phase differential device 13 to acquire the presumed crossing point position PHO. Under the feedback control in the digital area in this way, the presumed crossing point position PHO may be acquired which varies in a stable manner in accordance with substantially instantaneous changes in position PINST of the crossing points.

Figure 4:
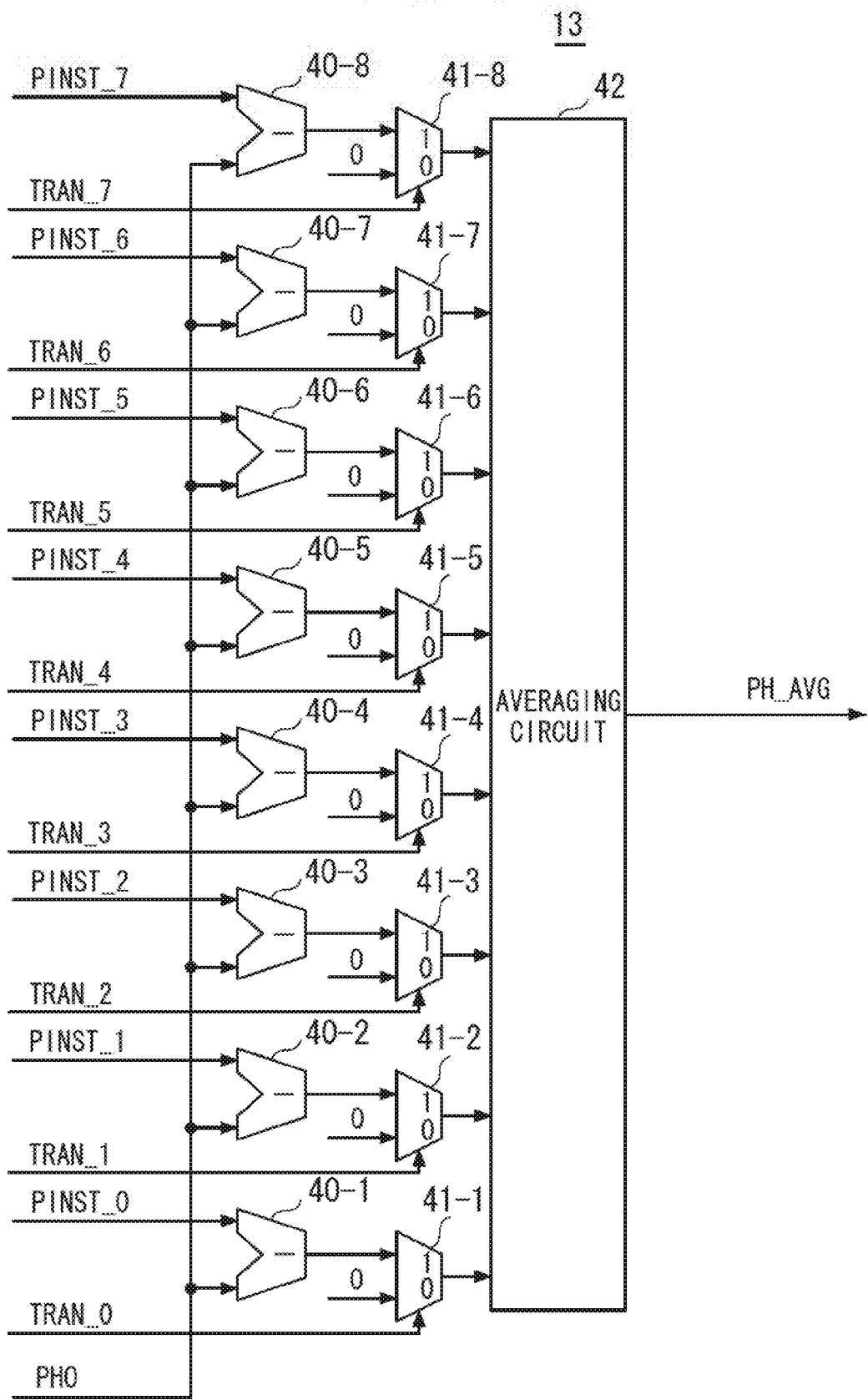
FIG. 4 is an example of a phase differential device.

FIG. 4 is a diagram illustrating an example of the configuration of the phase differential device 13. The phase differential device 13 includes subtractors 40-1 to 40-8, selectors 41-1 to 41-8, and an averaging circuit 42. The subtractors 40-1 to 40-8 receive the crossing point positions PINST_0 to PINST_7 corresponding to 8 UIs from the phase detector 12. The subtractors 40-1 to 40-8 further receive the presumed crossing point position PHO. Each of the subtractors 40-1 to 40-8 acquires the difference between the corresponding crossing point position and the presumed crossing point position PHO and supplies the difference value to the selectors 41-1 to 41-8. The selectors 41-1 to 41-8 select and output the corresponding difference values or a fixed value 0 in accordance with the corresponding transition flags TRAN_0 to TRAN_7. When the corresponding transition flag is 0, the fixed value 0 is selected and is output. When the corresponding transition flag is 1, the difference value is selected and is output.

Figure 5:
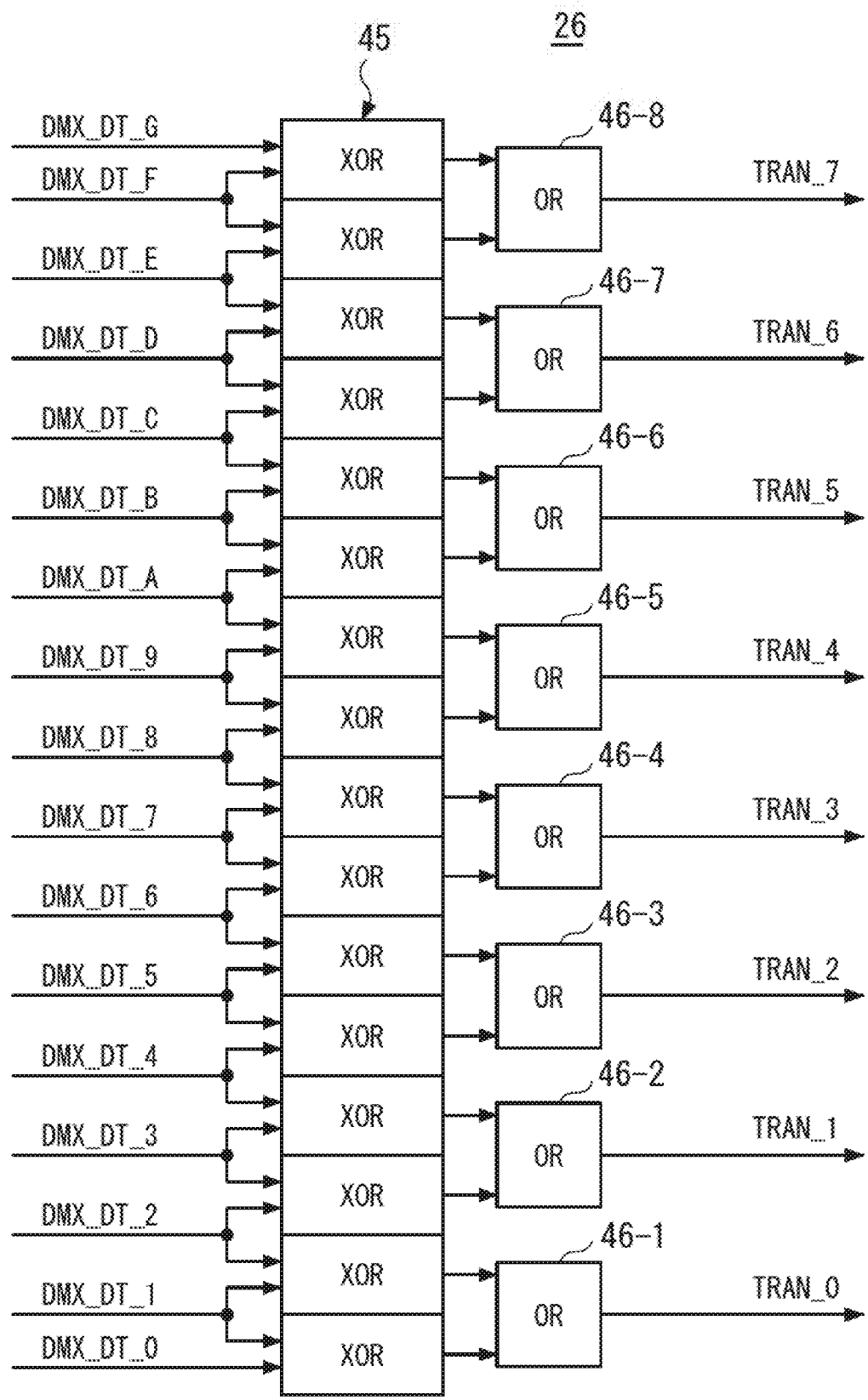
FIG. 5 is an example of a transition flag creating section in the phase detector.

FIG. 5 is a diagram illustrating an example of the configuration of a transition flag creating section 26 in the phase detector 12. The transition flag creating section 26 includes an XOR circuit array 45 and a plurality of OR circuits 46-1 to 46-8. The XOR circuit array 45 receives the sequence of digital codes DMX_DT_O to DMX_DT_G from the demultiplexer 11 and calculates the XOR of adjacent two digital codes on each of pairs of adjacent two digital codes. The XOR calculation may focus on the highest bits of the two digital codes and may be performed on the two bits. Here, DMX_DT_G is the digital code DMX_DT_O positioned at the end of the last 8th UI, as described above.

The OR circuits 46-1 to 46-8 are provided correspondingly to eight UIs. Each of the OR circuits 46-1 to 46-8 calculates the OR between the two XOR-calculated values, which are acquired for three digital codes corresponding to 1 UI. Thus, when even only one data transition occurs in the corresponding 1 UI, that is, when there is even only one crossing point therein, the transition flags TRAN_0 to TRAN_7, which are outputs of the OR circuits 46-1 to 46-8, become 1.

In FIG. 4, the averaging circuit 42 acquires the average value of the difference values from the selectors 41-1 to 41-8. The calculation of the average value may ignore the fixed value 0, which is input from the selectors 41-1 to 41-8. Thus, only for the UI with a data transition, the average value PH_AVG of the differences between the crossing point positions PINST and the presumed crossing point positions PHO may be acquired.

In FIG. 1, the phase integrator 14 performs an integration operation on the average value PH_AVG of the differences. The phase integrator 14 includes a gain multiplier 14-1 and an integrator 14-2. The gain multiplier 14-1 multiplies the input difference average value PH_AVG by a specific gain coefficient g1 and outputs the result of the multiplication. The integrator 14-2 integrates the multiplication result from the gain multiplier 14-1. The integrator 14-2 adds the multiplication result from the gain multiplier 14-1 of the current cycle to the integration result for the last cycle and holds the result of the addition as the integration result for the current cycle. Such an integrator may include an adder and a flip-flop.

The phase integrator 15 includes a gain multiplier 15-1 that multiplies a specific gain coefficient g2 and an integrator 15-2 that integrates the output by the gain multiplier 15-1. The operation by the phase integrator 15 is similar to that of the phase integrator 14, but the input to the phase integrator 15 is the integration result acquired by the phase integrator 14. The adder 16 adds the integration result acquired by the phase integrator 14 and the integration result acquired by the phase integrator 15 to acquire the presumed crossing point position PHO. The phase integrator 15 is not an essential feature, but the necessity may be determined in accordance with the change characteristic of the difference between a source clock signal and a destination clock signal.

The data determining section 18 receives the crossing point positions PINST_0 to PINST_7 corresponding to 8 UIs and 0/1 determination results DT_0 to DT_16 from the phase detector 12 and receives the presumed position PPICK of the data center point from the adder 17. Here, the determination results DT_0 to DT_16 may be acquired by the binary determination to 0 or 1 on the digital codes DMX_DT_0 to DMX_DT_G from the demultiplexer 11.

Figure 6:
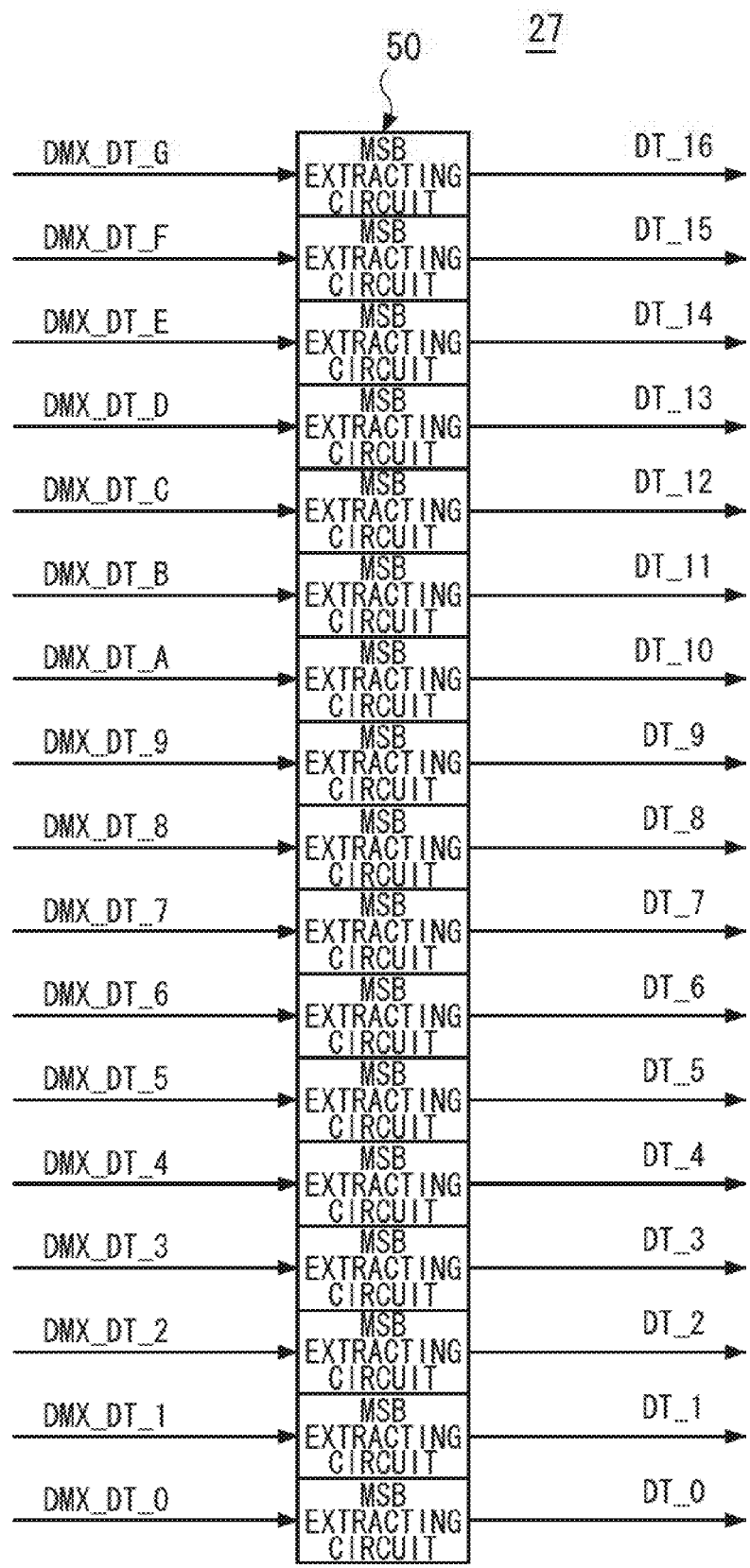
FIG. 6 is an example of a binary determining circuit in the phase detector.

FIG. 6 illustrates an example of a binary determining circuit 27 in the phase detector 12. The binary determining circuit 27 illustrated in FIG. 6 includes an MSB extracting circuit array 50. The MSB extracting circuit array 50 extracts the most significant bits of the digital codes DMX_DT_0 to DMX_DT_G from the demultiplexer 11 and creates 17 0/1 determination results DT_0 to DT_16 as 1-bit binary data.

Figure 7:
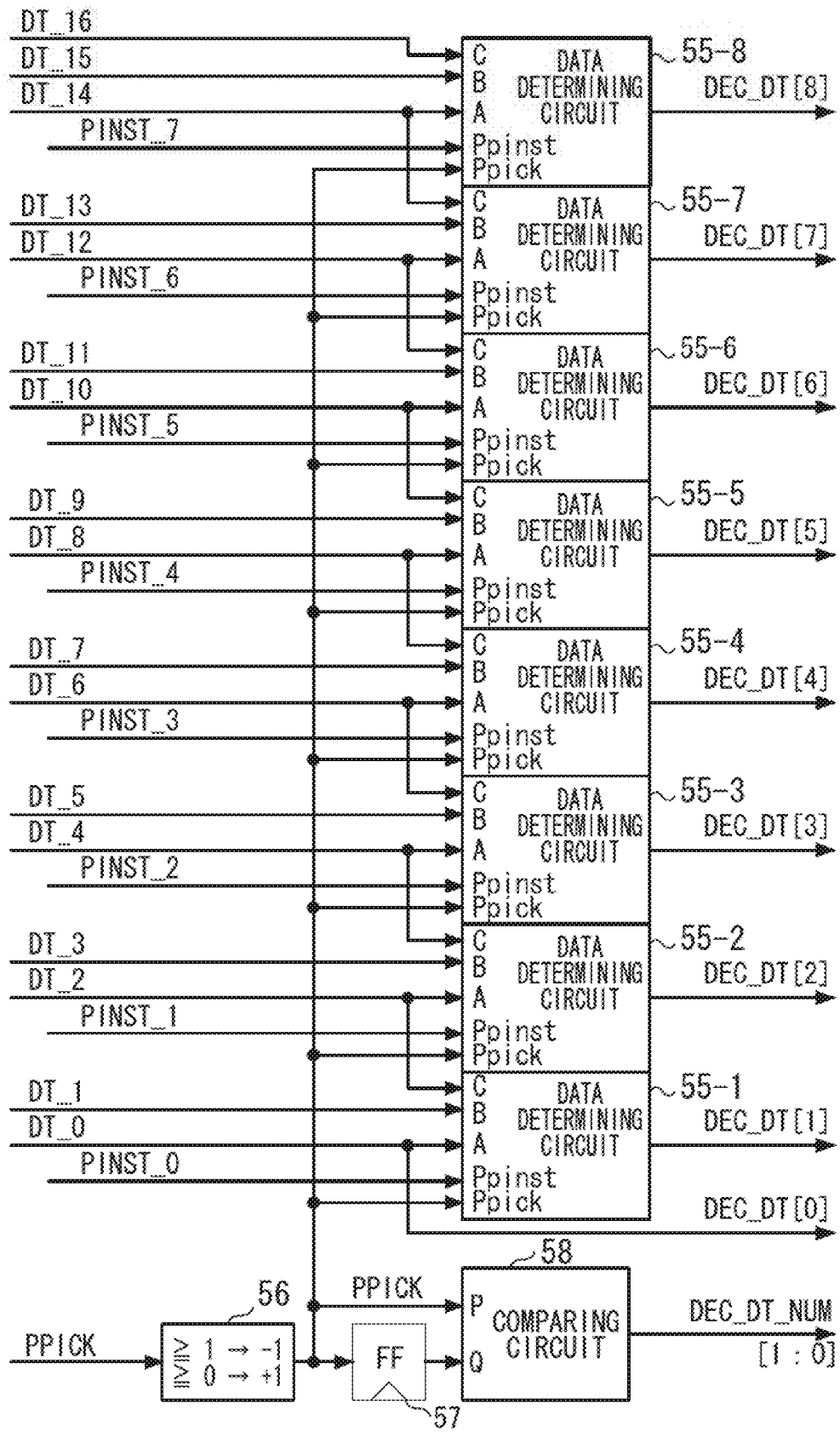
FIG. 7 is an example of a data determining section.

FIG. 7 illustrates an example of the data determining section 18. The data determining section 18 extracts the sequence of data determination values of the digital codes based on the positions PINST_0 to PINST_7 of the crossing points and the presumed position PPICK at the data center point. The data determining section 18 selects binary data from the sequence of binary data DT_0 to DT_16, which are acquired by performing binary determination on the sequence of the digital codes. Thus, the sequence of the data determination values may be extracted.

The data determining section 18 in FIG. 7 includes data determining circuits 55-1 to 55-8, a folding circuit 56, a flip-flop 57, and a comparing circuit 58. The folding circuit 56 outputs the presumed position of the data center point PPICK as is if it is lower than 1, and outputs PPICK−1 as a new PPICK when the presumed position of the data center point PPICK is equal to or higher than 1. When the presumed position of the data center point PPICK is equal to or lower than 0, the folding circuit 56 may output PPICK+1 as the new PPICK. The processing by the folding circuit 56 allows the presumed position of the data center point PPICK to be always within the range of a focus UI.

The data determining circuits 55-1 to 55-8 are provided correspondingly to eight UIs. Each of the data determining circuits 55-1 to 55-8 selects one binary data piece from three binary data pieces (which are 0/1 determination results) corresponding to 1 UI and outputs the one binary data piece as one of the data determination values DEC_DT[1] to DEC_DT[8]. The selection of one binary data piece for 1 UI includes referring to the presumed position of the data center point PPICK positioned within the UI and the position PINST of the crossing point corresponding to the UI.

Figure 8A:
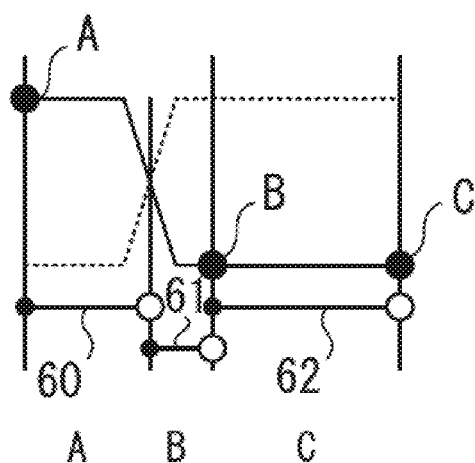
FIGS. 8A to 8D illustrate a selecting method that selects one binary datum from three binary data corresponding to one UI.

FIGS. 8A to 8D are diagrams illustrating a selecting method for selecting one binary data piece from three binary data pieces corresponding to 1 UI. In FIG. 8A, the binary data pieces A to C are the 0/1 determination results from the digital codes in a focused 1 UI. In this example, the binary data piece A is 1, and the binary data pieces B and C are 0. The ranges 60 to 62 do not overlap with each other within the focus UI. The range 60 is a range from the left end (including the point at the left end) to the crossing point position PINST (excluding the crossing point) within the focused UI. The range 61 is a range from the crossing point position PINST (including the crossing point) to a sampling point (excluding the sampling point) of the binary data piece B. The range 62 is a range from a sampling point (including the sampling point) of the binary data piece B to the right end (excluding the point at the right end) within the focused UI.

The binary data piece A, B, or C illustrated in FIG. 8A is to be selected if the presumed position of the data center point PPICK belongs to the range 60, 61, or 62. In other words, for example, if the presumed position of the data center point PPICK belongs to the range 60, the binary data piece A is to be selected. If the presumed position of the data center point PPICK belongs to the range 61, the binary data piece B is to be selected. If the presumed position of the data center point PPICK belongs to the range 62, the binary data piece C is to be selected. Basically, when the position of the crossing point is considered as a boundary, the binary data at the sampling point on the same side as the side where the presumed position of the data center point PPICK positions may be selected. For example, in the case of the range 61, the selection of the binary data piece B and the selection of the binary data piece C may provide the same result.

Figure 8B:
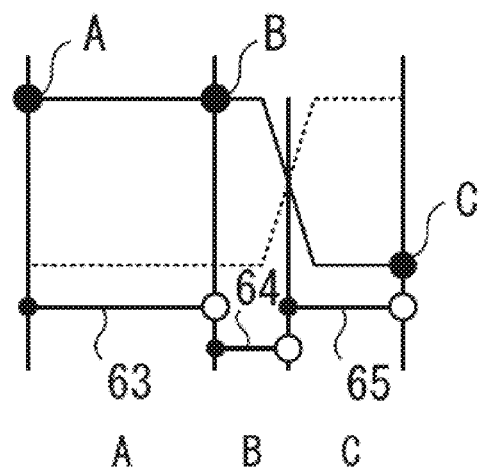

In FIG. 8B, like FIG. 8A, the binary data pieces A to C are the 0/1 determination results on the digital codes belonging to the focused 1 UI. The binary data pieces A and B are 1, and the binary data C is 0. The ranges 63 to 65 do not overlap with each other within the focused UI. The range 63 is a range from the left end of the focused UI (including the point at the left end) to the sampling point (excluding the sampling point) of the binary data piece B. The range 64 is a range from the sampling point (including the sampling point) of the binary data piece B to the crossing point position PINST (excluding the crossing point). The range 65 is a range from the crossing point position PINST (including the crossing point) to the right end (excluding the point at the right end) of the focused UI.

The binary data piece A, B or C in FIG. 8B is to be selected if the presumed position of the data center point PPICK belongs to the range 63, 64, or 65. In other words, for example, if the presumed position of the data center point PPICK belongs to the range 63, the binary data piece A is to be selected. If the presumed position of the data center point PPICK belongs to the range 64, the binary data piece B is to be selected. If the presumed position of the data center point PPICK belongs to the range 65, the binary data piece C is to be selected. The same principle as described above is also true here in which when the position of the crossing point is considered as a boundary, the binary data at the sampling point on the same side as the side where the presumed position of data center point positions PPICK may be selected.

Figure 8C:
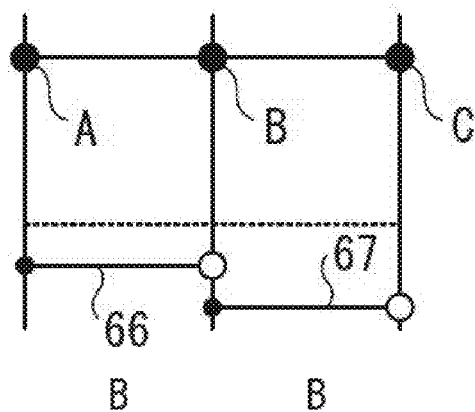

In FIG. 8C, the binary data pieces A to C are all 1. The ranges 66 and 67 do not overlap with each other within the focused UI. The range 66 is a range from the left end of the focused UI (including the point at the left end) to the sampling point (excluding the sampling point) of the binary data piece B. The range 67 is a range from the sampling point (including the sampling point) of the binary data piece B to the right end (excluding the point at the right end) of the focused UI.

The binary data piece B, or B in FIG. 8C, is to be selected if the presumed position of the data center point PPICK belongs to the range 66 or 67. In other words, for example, if the presumed position of the data center point PPICK belongs to the range 66, the binary data piece B is to be selected. If the presumed position of the data center point PPICK belongs to the range 67, the binary data piece B is to be selected. In this case, because the binary data pieces A to C are all the same, any of the data may be selected. The selection of any of the data provides the same result. The same is true in the case where the binary data A to C are all 0.

Figure 8D:
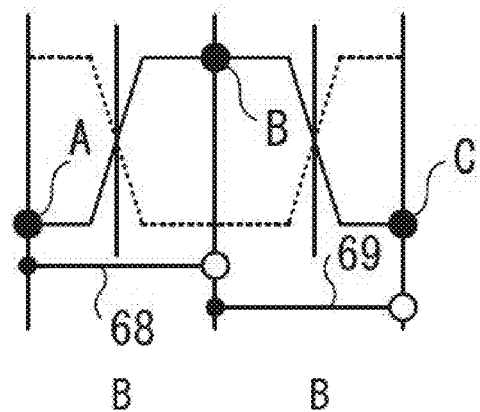

In FIG. 8D, the binary data pieces A, B and C are 0, 1 and 0, respectively. The ranges 68 and 69 do not overlap with each other within the focused UI. The range 68 is a range from the left end of the focused UI (including the point at the left end) to the sampling point (excluding the sampling point) of the binary data piece B. The range 69 is a range from a sampling point (including the sampling point) of the binary data piece B to the right end (excluding the point at the right end) of the focused UI.

The binary data piece B, or B in FIG. 8D, is to be selected if the presumed position of the data center point PPICK belongs to the range 68 or 69. In other words, for example, if the presumed position of the data center point PPICK belongs to the range 68, the binary data piece B is to be selected. If the presumed position of the data center point PPICK belongs to the range 69, the binary data piece B is to be selected. In other words, when two crossing points occur, the binary data piece B, which is the center value, is typically selected. The same is true in the case where the binary data pieces A, B and C are 1, 0 and 1, respectively, and 0 of the binary data piece B is selected as the data determination value.

Figure 9:
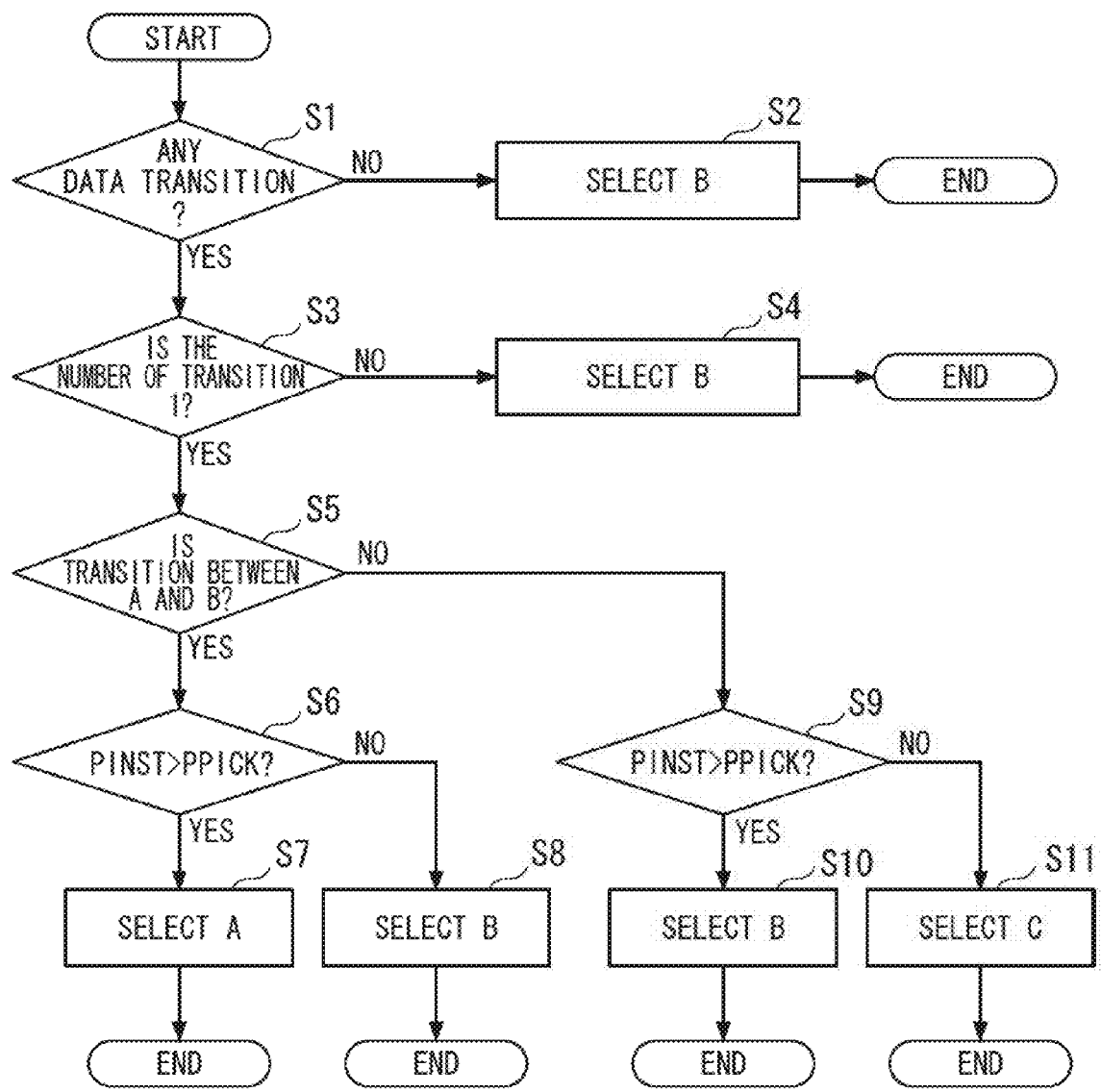
FIG. 9 is a flowchart illustrating a selecting method that selects one binary data piece from three binary data pieces corresponding to one UI.

FIG. 9 is a flowchart illustrating a method for selecting one binary data piece from three binary data pieces corresponding to 1 UI. In step S1, whether the focused UI has any data transition or not is determined. If not, the binary data piece B at the center is selected in step S2. If so in step S1, whether the number of transitions is 1 or not is determined in step S3. If not, it is determined that two transitions have occurred. Then, in step S4, the binary data piece B at the center is selected. If so in step S3, whether the transition has occurred between the sampling point for A and the sampling point for B or not is determined in step S5.

If so in step S5, whether the crossing point position PINST is higher than the presumed position of the data center point PPICK or not is determined in step S6. If so, the binary data piece A is selected in step S7. If the crossing point position PINST is equal to or lower than presumed position of the data center point PPICK, the binary data piece B is selected in step S8.

If it is determined in step S5 that the transition is not between the sampling point for A and the sampling point for B, whether the crossing point position PINST is higher than the presumed position of the data center point PPICK or not is determined in step S9. If so; the binary data piece B is selected in step S10. If the crossing point position PINST is equal to or lower than the presumed position of the data center point PPICK, the binary data piece C is selected in step S11.

Figure 10:
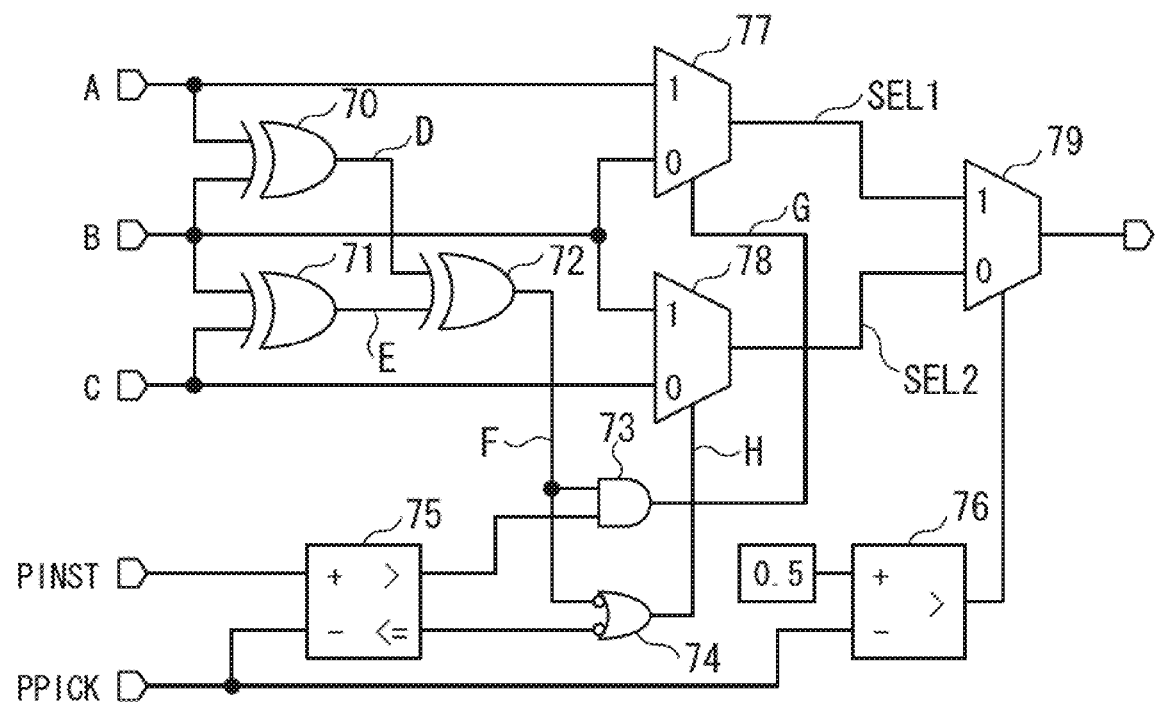
FIG. 10 is an example of a circuit that selects one binary data piece from three binary data pieces corresponding to one UI.

FIG. 10 is an example of a circuit that selects one binary data piece from three binary data pieces corresponding to 1 UI. The circuit illustrated in FIG. 10 may be used as each of the data determining circuits 55-1 to 55-8 in FIG. 7. The data determining circuit illustrated in FIG. 10 includes XOR circuits 70 to 72, an AND circuit 73, a negative logic input OR circuit 74, comparing circuits 75 and 76, and selectors 77 to 79. The comparing circuit 75 outputs 1 on the ">" side and outputs 0 on the "≦" side if the crossing point position PINST is higher than the PPICK. If the crossing point position PINST is equal to or lower than the presumed position of the data center point PPICK, the output is 0 on the ">" side and the output is 1 on the "≦" side. The comparing circuit 76 outputs 1 if the presumed position of the data center point PPICK is lower than 0.5. If the presumed position of the data center point PPICK is equal to or higher than 0.5, the output is 0. Each of the selectors 77 to 79 selects and outputs the input signal on the "1" side if the supplied selection control signal is 1 and selects and outputs the input signal on the "0" side if the selection control signal is 0.

FIG. 11 illustrate logical value tables of operations by the circuit in FIG. 10. The upper table of FIG. 11 illustrates the operation when PINST>PPICK. The lower table of FIG. 11 illustrates the operation when PINST≦PPICK. The logical value tables depict logical values of the signals illustrated in FIG. 10. The "X" is a "Don't Care" value. For example, the upper table of FIG. 11 illustrates that SEL1 is A if PINST>PPICK and A, B, and C are 1, 0, and 0, respectively. In this case, because the crossing point position PINST is between A and B, the presumed position of the data center point PPICK is naturally lower than 0.5. Then, the comparing circuit 76 illustrated in FIG. 10 outputs 1. Therefore, the logical value 1 for A, which is SEL1, is selected and is output as the data determination result. This is equivalent to the case where the presumed position of the data center point PPICK exists in the range 60 illustrated in FIG. 8A.

Furthermore, for example, the lower table of FIG. 11 illustrates that SEL2 is C if PINST≦PPICK and A, B, and C are 1, 1, and 0, respectively. In this case, because the crossing point position PINST is between B and C, the presumed position of the data center point PPICK is naturally equal to or higher than 0.5. Then, the comparing circuit 76 in FIG. 10 outputs 0. Therefore, the logical value 0 for C, which is SEL2, is selected and is output as the data determination result. This is equivalent to the case where the presumed position of the data center point PPICK exists in the range 65 in FIG. 8B.

In FIG. 7, the data determining circuits 55-1 to 55-8 select one binary data piece from three binary data pieces corresponding to 1 UI in the manner as described above and output the data determination values DEC_DT[1] to DEC_DT[8]. Notably, the binary data piece DL_0 at one end of the 8th UI section is additionally output as is as the data determination value DEC_DT[0]. Data deletion and/or addition is performed on the data determination values DEC_DT[0] to DEC_DT[8] as required to adjust the data rate between the source and the destination. The data rate adjustment will be described below.

If the data rates agree between the source and the destination, that is, if the source clock frequency and the destination clock frequency agree in average, the data determination values DEC_DT[1] to DEC_DT[8], which are acquired in the manner described above, may be handled as receive data as is. However, the extraction of eight data determination values for 8 UIs as the receive data every time may not address the case where the data rates do not agree between the source and the destination. In other words, if the source clock frequency and the destination clock frequency do not agree in average, it is important to extract eight or more or eight or less data determination values for 8 UIs as the receive data at a certain timing and adjust the total number of the receive data.

In order to adjust the total number of the receive data, the flip-flop 57 and comparing circuit 58 are provided. The flip-flop 57 stores the presumed position of the data center point PPICK of the last operation cycle. The comparing circuit 58 compares the presumed position of the data center point PPICK of the current cycle and the output (which is the presumed position of the data center point PPICK of the last cycle) by the flip-flop 57 with the fixed value 0.5. If the presumed position of the data center point PPICK of the current cycle is lower than 0.5 and the presumed position of the data center point PPICK of the last cycle is higher than 0.5, the comparing circuit 58 creates an instruction signal DEC_DT_NUM for the first state. If the presumed position of the data center point PPICK of the current cycle is higher than 0.5 and the presumed position of the data center point PPICK of the last cycle is lower than 0.5, the comparing circuit 58 creates an instruction signal DEC_DT_NUM for the second state. The instruction signal DEC_DT_NUM may be created based on the determination on whether the presumed position of the data center point PPICK before being folded in the folding circuit 56 changes across 1.0 (which is the boundary value of UI) or not. Alternatively, the instruction signal DEC_DT_NUM may be created based on the determination on whether the presumed crossing point position PHO before the addition of 0.5 by the adder 17 in FIG. 1 changes across 0.5 (which is the center value of the UI) or not. The instruction signal DEC_DT_NUM may be 2-bit binary data. The 2 bits allow the designation of the first state, the second state, or a third state, which is neither the first state nor the second state.

In FIG. 1, the data determining section 18 creates the instruction signal DEC_DT_NUM for the first state if the presumed position of the data center point PPICK changes in the delaying direction and falls out of the range (1 UI) which is substantially equal to the length of the data interval. The data determining section 18 creates the instruction signal DEC_DT_NUM for the second state if the presumed position of the data center point PPICK changes in the advancing direction and falls out of the range (1 UI) which is substantially equal to the length of the data interval. The data determining section 18 further outputs the data sequences DEC_DT[0] to DEC_DT[8] resulting from the addition of the additional data DEC_DT[0] to sequences of the data determination values DEC_DT[1] to DEC_DT[8].

In response to the instruction signal DEC_DT_NUM for the first state, the determination data output section 19 skips one data piece in the sequence of the data determination values DEC_DT[1] to DEC_DT[8] and outputs 7-bit data. In response to the instruction signal DEC_DT_NUM for the second state, the determination data output section 19 outputs the 9-bit data sequences DEC_DT[0] to DEC_DT[8]. In response to the instruction signal DEC_DT_NUM for the third state, which is neither the first state nor the second state, the determination data output section 19 outputs the sequence of 8-bit data determination values DEC_DT[1] to DEC_DT[8]. These operations by the determination data output section 19 may be easily implemented with an FIFO. That is, an FIFO included in the determination data output section 19 may capture 7 bits of the data determination values DEC_DT[2] to DEC_DT[8] in response to the instruction signals DEC_DT_NUM for the first state. Furthermore, the FIFO included in the determination data output section 19 may capture all of the 9 bits of data determination values DEC_DT[0] to DEC_DT[8] in response to the instruction signal DEC_DT_NUM for the second state. The FIFO included in the determination data output section 19 may only capture 8 bits of the data determination values DEC_DT[1] to DEC_DT[8] in response to the instruction signal DEC_DT_NUM for the third state. With the instruction signal for the third state, no data is skipped or added. The FIFO included in the determination data output section 19 sorts the captured data pieces and outputs a group of 8-bit received user data USER_DT[7:0] (or USER_DT[0] to USER_DT[7]).

As illustrated in FIG. 1, data is read from the FIFO included in the determination data output section 19 in synchronization with a clock signal PI_CK4 created by the phase interpolator 22. The phase interpolator 22 uses four-phase clock signals at 625 MHz, for example, created by the frequency dividing circuit 21 and creates the clock signal PI_CK4 having a desirable phase by synthesizing the four-phase clock signals. At that time, the higher bits (such as 6 bits) of the phase presumed value, which is the output by the phase integrator 15, is extracted by the bit extracting circuit 20 and is supplied to the phase interpolator 22 as a phase code PCODE. The phase interpolator 22 creates the clock signal PI_CK4 such that the phase of the clock signal PI_CK4 may agree with the phase value indicated by the phase code PCODE. The phase adjustment allows the agreement between the data rate of the source and the data rate of the data read from the determination data output section 19. Notably, the precision of the phase adjustment by the phase interpolator 22 may be lower without problems than the precision required by a CDR circuit in the past.

Figure 12:
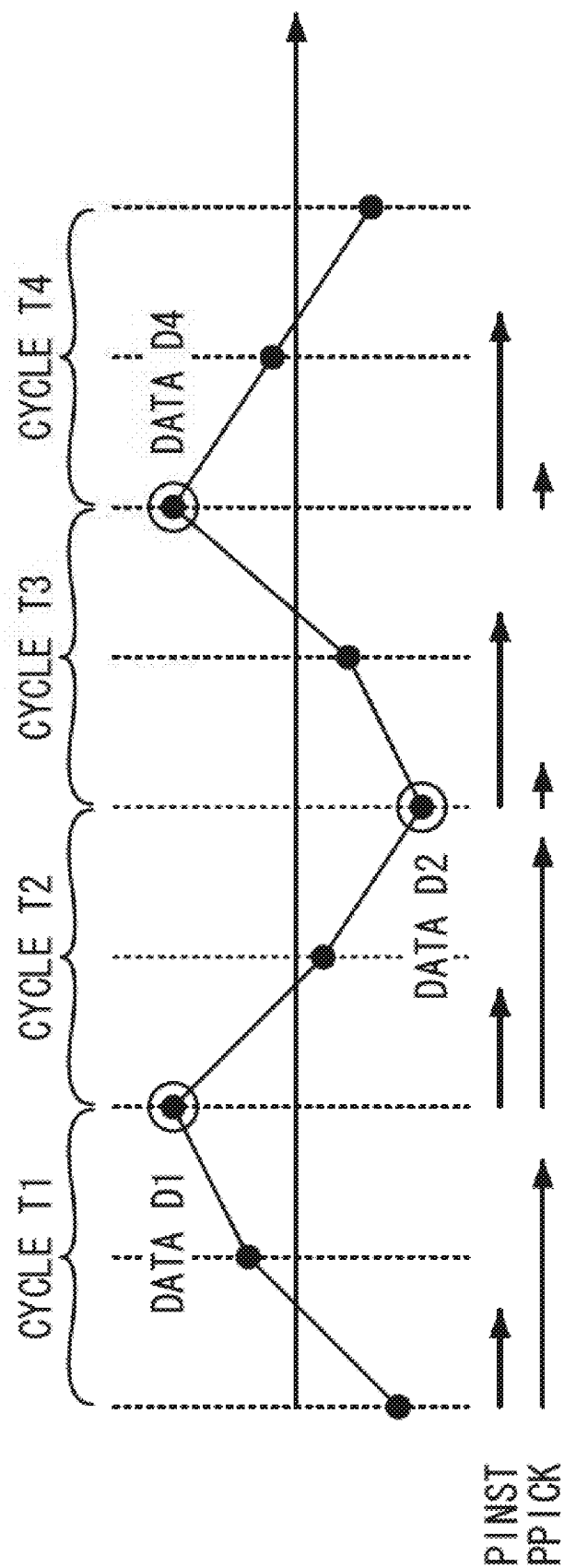
FIG. 12 illustrates an operation of skipping data.

FIG. 12 illustrates an operation of skipping data. In FIG. 12 illustrates an operation cycle from operation cycle T1 to an operation cycle T4. In each of the operation cycles, one UI is to be processed. At the bottom of each of the operation cycles, a crossing point position PINST and a presumed datacenter position PPICK are illustrated. In the operation cycle T1, the last data piece D1 (at the rightmost end) is selected and is output from the data pieces at 3 points in the UI. In the operation cycle T2, the last data D2 (at the rightmost end) is selected and is output from the data pieces at 3 points in the UI. In transition from the operation cycle T2 to the operation cycle T3, the presumed position of the data center point PPICK changes in the delaying direction (that is, in the right direction on the figure) and goes beyond the boundary of 1 UI. In this case, in the operation cycle T3, the last data piece (at the rightmost end) of the data pieces at 3 points in the UI may not be selected but is skipped. In the next operation cycle T4, the first data piece D4 (at the leftmost end) is selected and is output from the data pieces at 3 points in the UI. In this way, the data skip allows the agreement in data rate between the source and the destination.

Figure 13:
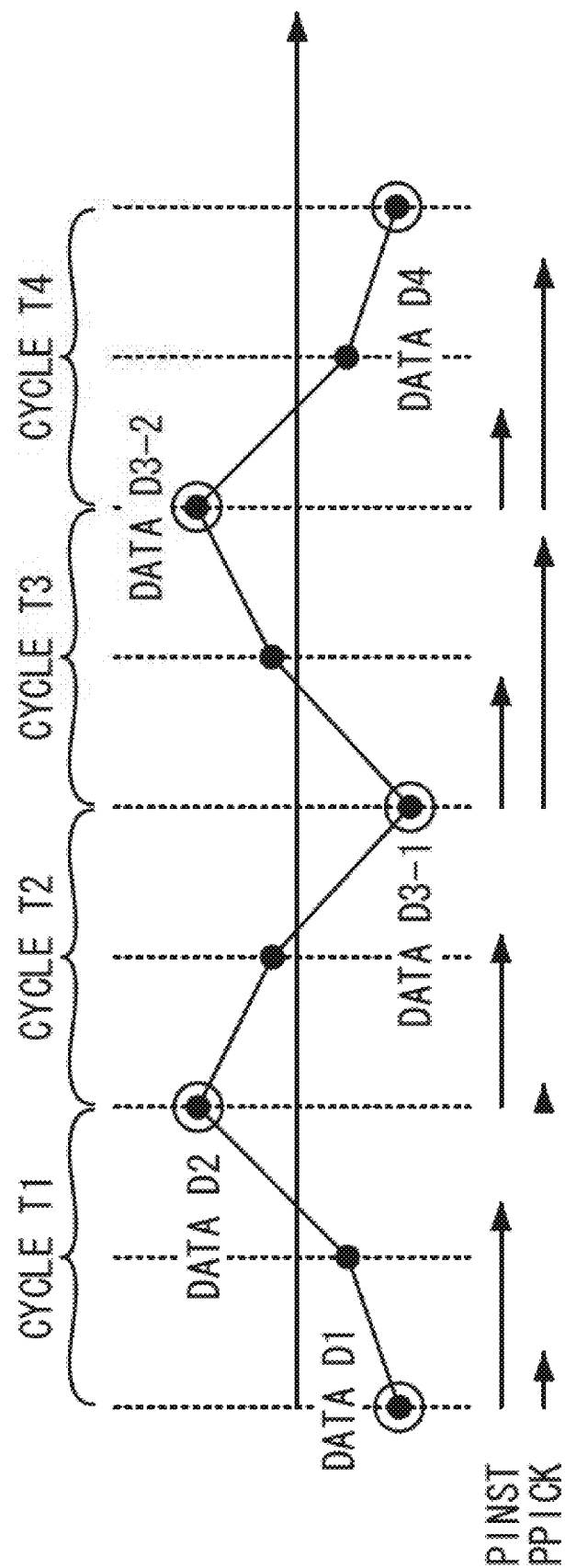
FIG. 13 illustrates an operation of adding data.

FIG. 13 illustrates an operation of adding data. In FIG. 13 illustrates an operation cycle from operation cycle T1 to an operation cycle T4. In each of the operation cycles, one UI is to be processed. At the bottom of the operation cycles, crossing point positions PINST and presumed positions of the data center points PPICK are illustrated. In the operation cycle T1, the first data piece D1 (at the leftmost end) is selected and is output from the data pieces at three points in the UI. In the operation cycle 12, the first data piece D2 (at the leftmost end) is selected and is output from the data pieces at three points in the UI. In transition from the operation cycle T2 to the operation cycle T3, the presumed position of the data center point PPICK changes in the advancing direction (that is, in the left direction on the figure) and goes beyond the boundary of 1 UI. In this case, in the operation cycle T3, the first data piece D3-1 (at the leftmost end) and the last data piece D3-2 (at the rightmost end) of the data pieces at three points in the UI are selected and are output. In the operation cycle T4, the last data piece D4 (at the rightmost end) is selected and is output from the data pieces at three points in the UI. In this way, the data addition allows the agreement in data rate between the source and the destination.

Figure 14:
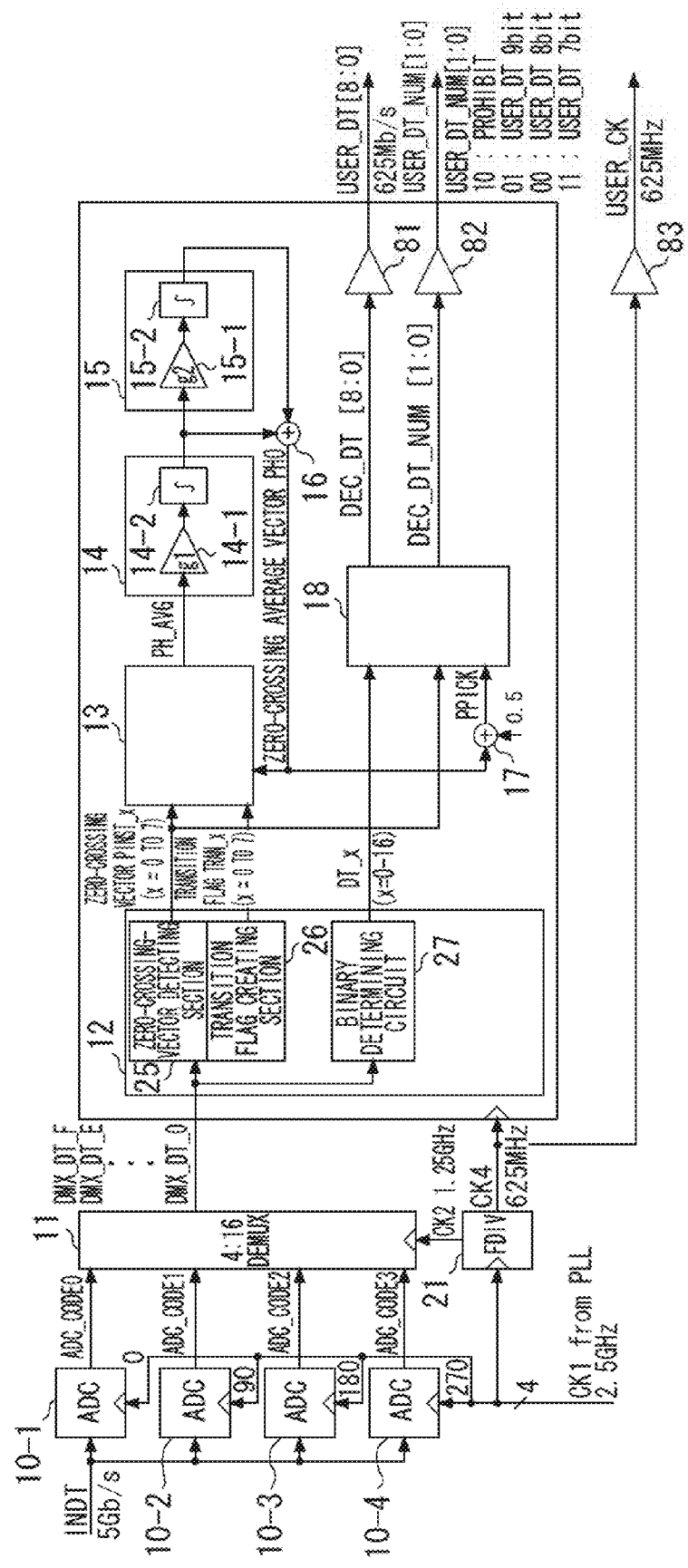
FIG. 14 is another example of the data recovery circuit.

FIG. 14 is another example of the data recovery circuit. In FIG. 14, the same reference numerals are given to the same components as those in FIG. 1, and the description thereon will be omitted herein. The data recovery circuit in FIG. 14 further includes buffers 81 to 83 while excluding the determination data output section 19, bit extracting circuit 20, phase interpolator 22, and buffer 23 in the data recovery circuit in FIG. 1. In other words, the function of adjusting the data rate by data skip or addition is deleted from the configuration in FIG. 1.

In the actual implementation of the data transmission and reception functions, the clock hand-off is performed in the upper layer. Therefore, the clock hand-off is not essential feature to perform in the physical layer of a high-speed I/O, unlike the embodiment illustrated in FIG. 1. However, in this case, the data width of the output by the physical layer of a high-speed I/O is not typically a fixed bit width. For example, the output data width may be 8 bits in most cases but may be 7 bits or 9 bits in accordance with the change in input data. The signal indicating the change is a signal USER_DT_NUM[1:0] which is similar to DEC_DT_NUM[1:0] in FIG. 1.

Figure 15:
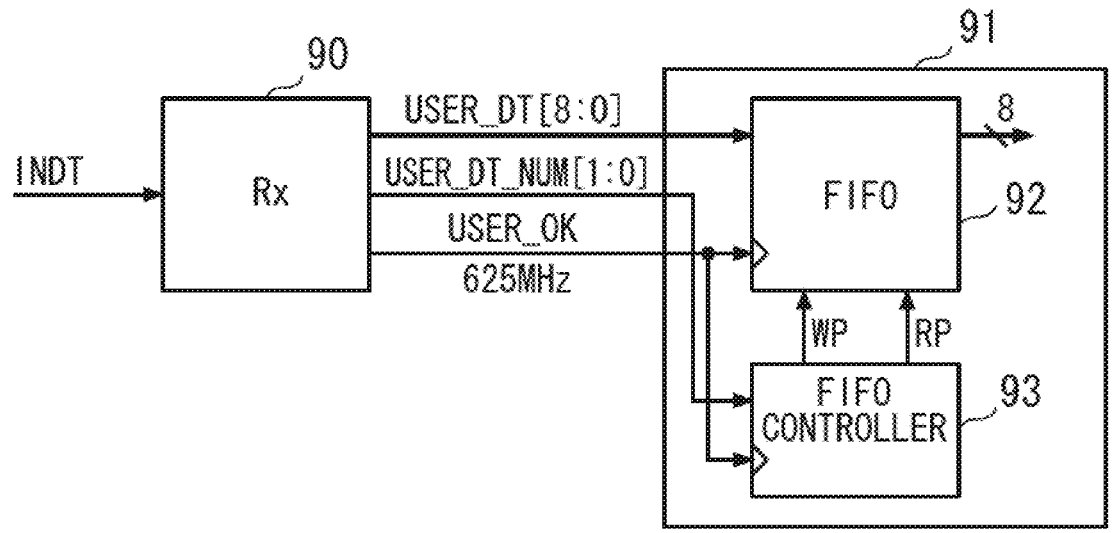
FIG. 15 is an example of a circuit that adjusts the data rate with an external logic.

FIG. 15 is an example of the circuit that adjusts the data rate with an external logic. The data receiving circuit illustrated in FIG. 15 includes a data recovery circuit 90 and an external logic 91 illustrated in FIG. 15. The external logic 91 includes an FIFO 92 and an FIFO controller 93. The FIFO 92 and FIFO controller 93 operate in synchronization with a USER_CK. The FIFO controller 93 designates a write pointer WP or a read pointer RP to control the data write or data read on the FIFO 92. The FIFO controller 93 defines the write pointer WP and read pointer RP based on the USER_DT_NUM[1:0] from the data recovery circuit 90.

The parallel data USER_DT output by the data recovery circuit 90 is not typically 8 bits but may change by ±1 bit in accordance with jitter contained in the input analog signal INDT. Notably, the USER_DT is a data signal corresponding to DEC_DT described in the configuration in FIG. 1. The information describing the variation by ±1 bit is transmitted from the data recovery circuit 90 to the external logic 91 as USER_DT_NUM[1:0]. The external logic 91 receives the USER_DT in synchronization with USER_CK from the data recovery circuit 90 and writes the received data to the FIFO 92. The data size to be written in the FIFO 92 varies in accordance with the USER_DT_NUM. The control over the write data is the same as the control described regarding the FIFO included in the determination data output section 19 in FIG. 1. The control over the size of data to be written in the FIFO 92 in this way may reduce the variation in data rate by ±1 bit.

The receive data periodically has an adjustment code defined by the specification for the upper layer. The external logic 91 uses the adjustment code to implement flow control for absorbing the difference in data rate between the source and the destination.

Figure 16A:
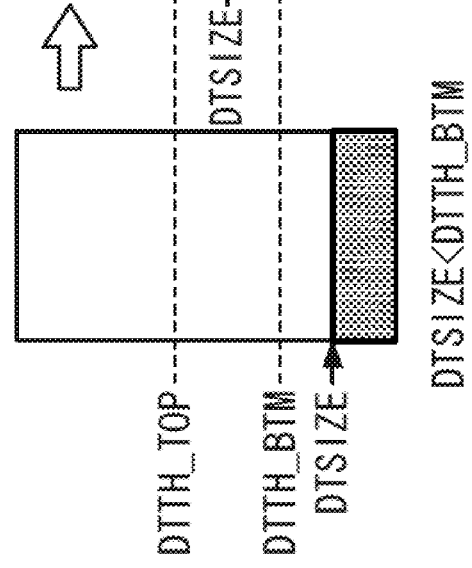
FIGS. 16A and 16B are diagrams illustrating the flow control with an external logic.
Figure 16B:
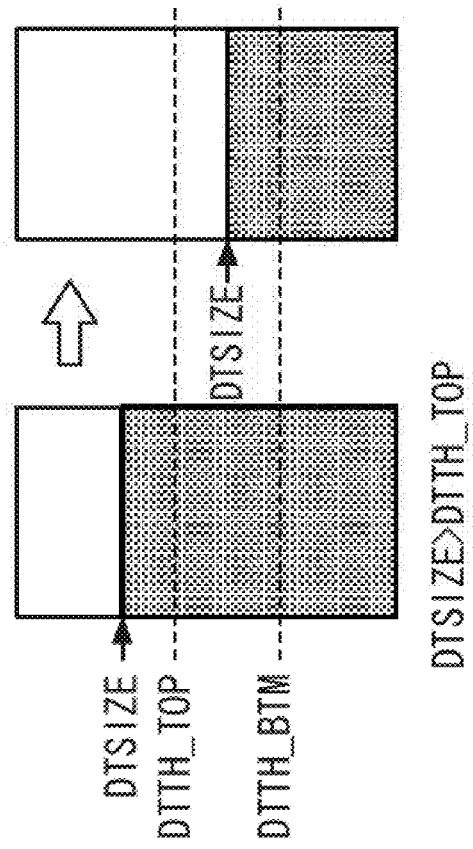

FIGS. 16A and 16B are diagrams for describing flow control with an external logic. The FIFO controller 93 determines the size DTSIZE of data stored in the FIFO 92 by managing a write pointer WP indicating a write data address or a read pointer RP indicating a read data address. As illustrated in FIG. 16A, if the DTSIZE is higher than a specific threshold data size DTTH_TOP, the FIFO controller 93 determines that the write data rate is higher than the read data rate. In other words, the FIFO controller 93 determines that the data rate of the source is higher than the data rate of the destination. In this case, the external logic 91 abandons the adjustment code present periodically to reduce the DTSIZE lower than DTTH_TOP and adjust the difference in data rate between the source and the destination. As illustrated in FIG. 16B, if the DTSIZE is lower than a specific threshold data size DTTH_BTM, the FIFO controller 93 determines that the write data rate is lower than the read data rate. In other words, the FIFO controller 93 determines that the data rate of the source is lower than the data rate of the destination. In this case, the external logic 91 inserts an adjustment code to increase the DTSIZE higher than DTTH_BTM and adjust the difference in data rate between the source and the destination.

In this way, in the configuration of the data receiving circuit illustrated in FIG. 15, the function of adjusting the data rate by abandoning or inserting the adjustment code in accordance with the specification for the upper layer is provided as the FIFO 92 and FIFO controller 93. The use of the FIFO 92 and FIFO controller 93 to adjust the size of data to be written to the FIFO 92 based on USER_DT_NUM[1:0] as described above may absorb the variation in data rate by ±1 bit in the data recovery circuit 90. In this way, the configuration illustrated in FIG. 14 and FIG. 15 may implement the function of absorbing the data rate variation in data recovery with the cooperation between the data recovery circuit 90 and the external logic 91, rather than the data recovery circuit 90 alone.

According to at least one embodiment, an input signal is analog-digital-converted at a fixed sampling timing to acquire a sequence of digital codes, and the sampled data pieces are sorted out based on a transition point in the data, which is acquired by interpolating the sequence of the digital code. Capturing an input signal at a fixed sampling timing may eliminate the necessity of phase adjustment on the clock signal for sampling the input signal under feedback control by the receiver side and allows data determination based on phase presumption by digital processing. Therefore, it may not be influenced by a process variation and/or a variation in power supply voltage, for example, which may stabilize the performance of the data recovery operation. Furthermore, a data recovery circuit which may perform such a stable operation may be designed easily All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A data recovery circuit comprising:
   an analog-digital converter creating a digital code sequence, which is sampled at shorter intervals than data intervals of a data sequence, by converting an input analog signal indicating the data sequence to a digital signal in synchronization with a clock signal;
   a phase detector calculating, from the digital code sequence, a position of a crossing point where a segment acquired by interpolating the digital code sequence crosses the segment indicating a certain code value within a range of possible values of the digital codes;
   a phase estimator acquiring a presumed position of a data center point of the data sequence based on the position of the crossing point; and
   a data determining circuit extracting the sequence of a data determination value from the digital code sequence based on the position of the crossing point and the presumed position of the data center point.

2. The data recovery circuit according to claim 1, wherein the data determining circuit acquires the sequence of the data determination value by selecting binary data from a binary data sequence, which is acquired by performing binary determination on the digital code sequence.

3. The data recovery circuit according to claim 1, wherein the phase estimator acquires the presumed position of the data center point based on an average position in time of the positions of the crossing points.

4. The data recovery circuit according to claim 1, wherein the phase estimator acquires the presumed position of the data center point by shifting an average position in time of the positions of the crossing points by an amount substantially equal to a half of the data interval.

5. The data recovery circuit according to claim 1, wherein the phase estimator comprises:
   a differential circuit acquiring a difference between the position of the crossing point and the position of the presumed crossing point;
   an integrating circuit acquiring the position of the presumed crossing point by integrating the difference in time; and
   a circuit acquiring the presumed position of the data center point by shifting the position of the presumed crossing point by an amount substantially equal to half of the data interval.

6. The data recovery circuit according to claim 1, wherein the data determining circuit creates an instruction signal for a first state if the presumed position of the data center point changes in a delaying direction and the presumed position of the data center point falls outside of a range that is substantially equal to a length of the data interval, and creates an instruction signal for a second state if the presumed position of the data center point changes in an advancing direction and the presumed position of the data center point falls outside of the range.

7. The data recovery circuit according to claim 6 further comprising:
a determination data output circuit receiving a sequence of the data determination value and the instruction signal from the data determining circuit, skipping one data piece in the sequence of the data determination value and outputting the data in response to the instruction signal for the first state, and adding one data piece to the sequence of the data determination value and outputting the data in response to the instruction signal for the second state.

8. The data recovery circuit according to claim 7, wherein the data determining circuit outputs the data sequence resulting from an addition of one data piece to the sequence of the data determination value, and the determination data output circuit skips one data piece in the sequence of the data determination value and outputs the data in response to the instruction signal for the first state, outputs the data sequence in response to the instruction signal for the second state, and outputs the sequence of the data determination value in response to an instruction signal for a third state.

9. A data recovery method comprising:
creating a digital code sequence, which is sampled at shorter intervals than data intervals of a data sequence, by converting an input analog signal indicating the data sequence to a digital signal in synchronization with a clock signal;
calculating, from the digital code sequence, a position of the crossing point where a segment acquired by interpolating the digital code sequence crosses the segment indicating a certain code value within a range of the possible values of the digital codes;
acquiring a presumed position of the data center point of the data sequence based on the position of the crossing point; and
extracting a sequence of a data determination values from the digital code sequence based on the position of the crossing point and the presumed position of the data center point.

10. The method according to claim 9, wherein the extracting of the sequence of the data determination values acquires the sequence of the data determination values by selecting binary data from a binary data sequence, which is acquired by performing binary determination on the digital code sequence.

11. The method according to claim 9, wherein the acquiring of the presumed position of the data center point acquires the presumed position of the data center point based on an average position in time of the positions of the crossing points.

12. The method according to claim 9, wherein the acquiring of the presumed position of the data center point is performed by shifting an average position in time of the positions of the crossing points by an amount substantially equal to half of the data interval.

13. The method according to claim 9, wherein the acquiring of the presumed position of the data center point comprises:
acquiring a difference between the position of the crossing point and the position of the presumed crossing point;
acquiring the position of the presumed crossing point by integrating the difference in time; and
acquiring the presumed position of the data center point by shifting the position of the presumed crossing point by an amount substantially equal to half of the data interval.

14. The method according to claim 9, further comprising:
skipping one data piece in the data determination value sequence if the presumed position of the data center point changes in a delaying direction and the presumed position of the data center point falls outside of a range that is substantially equal to a length of the data interval; and
adding one data piece to the data determination value sequence if the presumed position of the data center point changes in an advancing direction and the presumed position of the data center point falls outside of the range.

15. A data receiving circuit comprising:
a data recovery circuit extracting a data determination value sequence from an input analog signal; and
a logic circuit that receives receive data contained in the data determination value sequence, stores the receive data in a buffer, and adjusts the data rate by abandoning or inserting an adjustment code in accordance with the size of the receive data within the buffer, the data recovery circuit having:
an analog-digital converter that creates a digital code sequence by converting the input analog signal to a digital signal at a fixed sampling timing;
a phase detector that calculates a transition point of the data of the input analog signal by interpolating the digital code sequence; and
a data determining circuit extracting the data determination value sequence by selecting the binary data based on the position of the transition point in the sequence of binary data resulting from binary determination on the digital code sequence,
wherein the logic circuit adjusts the number of data pieces to be stored in the buffer among data of the data determination value sequence.

* * * * *